(12) United States Patent
Brooks et al.

(10) Patent No.: US 7,947,927 B2
(45) Date of Patent: May 24, 2011

(54) HEATED TRAY

(76) Inventors: Norman Brooks, Miami, FL (US);
Charlie Rosenberg, Miami, FL (US);
Michael Zheng, Shenzhen (CN)

( * ) Notice: Subject to any disclaimer, the term of this patent is extended or adjusted under 35 U.S.C. 154(b) by 633 days.

(21) Appl. No.: 11/688,058

(22) Filed: Mar. 19, 2007

(65) Prior Publication Data
US 2007/0221663 A1 Sep. 27, 2007

Related U.S. Application Data

(63) Continuation-in-part of application No. 11/339,433, filed on Jan. 25, 2006, now abandoned.

(60) Provisional application No. 60/646,678, filed on Jan. 25, 2005.

(51) Int. Cl.
*A47J 27/18* (2006.01)
*F27D 11/00* (2006.01)

(52) U.S. Cl. ........ 219/432; 219/385; 219/429; 219/430; 219/435; 219/438; 219/441

(58) Field of Classification Search .................. 219/387, 219/419, 429, 432, 433, 441, 438, 544, 385, 219/430, 435
See application file for complete search history.

(56) References Cited

U.S. PATENT DOCUMENTS

| | | | |
|---|---|---|---|
| 3,806,701 A | 4/1974 | Scott | |
| 4,801,782 A | 1/1989 | Ineson | |
| 4,825,757 A * | 5/1989 | Stoner | 99/279 |
| 5,290,997 A | 3/1994 | Lai et al. | |
| 5,842,353 A | 12/1998 | Kuo Liang | |
| 5,897,805 A * | 4/1999 | McClean | 219/518 |
| 6,100,504 A | 8/2000 | Wagner | |
| 6,121,585 A | 9/2000 | Dam | |
| 6,674,052 B1 | 1/2004 | Luo | |
| 6,864,462 B2 | 3/2005 | Sanoner et al. | |
| 7,022,946 B2 | 4/2006 | Sanoner et al. | |
| 2004/0069766 A1 | 4/2004 | Haasis et al. | |

FOREIGN PATENT DOCUMENTS

| | | |
|---|---|---|
| JP | 402021820 A | 1/1990 |
| JP | 408024126 A | 1/1996 |
| JP | 409037945 A | 2/1997 |
| JP | 409154740 A | 6/1997 |
| JP | 411221160 A | 8/1999 |
| JP | 20000083789 | 3/2000 |

OTHER PUBLICATIONS

Machine Translation of JP 09-037945 A.*

* cited by examiner

*Primary Examiner* — Mark H. Paschall
*Assistant Examiner* — Brian Jennison
(74) *Attorney, Agent, or Firm* — Robert M. Schwartz (57) ABSTRACT

The present invention is an apparatus for heating the contents of a vessel wherein said vessel has a conducting plate that contacts the interior vessel contents and actuates a thermostat based on the temperature of interior contents.

13 Claims, 7 Drawing Sheets

HEATED TRAY

CROSS-REFERENCE TO RELATED APPLICATIONS

This application is a continuation-in-part of U.S. patent application Ser. No. 11/339,433 filed Jan. 25, 2006 which claims the benefit of U.S. Provisional Application 60/646,678, filed Jan. 25, 2005, the disclosures of which are incorporated herein by reference in their entirety.

TECHNICAL FIELD OF THE INVENTION

The present invention relates to a food warming apparatus, particularly to a tray with a base, and an accompanying beverage container configured for warming liquid or semisolid contents.

BACKGROUND OF THE INVENTION

Saké is a beverage fermented from rice containing approximately 15-17% alcohol by volume. Saké, is generally transparent and not aged and will last about one year without breaking down if kept in a cold, dark location. It also does not contain Sulfites, and has five (5) times more amino acid than wine. Saké is especially popular while eating seafood, and is served warm or cold. Warming Saké enhances the tasting experience and the effect of the alcohol for the consumer.

There are conceivably many ways of warming Saké, however it is not advisable to use boiling water nor a microwave oven for such warming.

The invention described herein presents an apparatus for quickly warming Saké to a desired consumption temperature less than 160 degrees Fahrenheit (71° C.), with 131 degrees Fahrenheit (55° C.) preferred.

Automated Saké warming devices have previously been disclosed. Japanese Pat. Nos. JP409037945A by Kibi and JP408024126A by Amano both describe implementations of automated warmers for the preparation of a Saké beverage.

Two features of automated Saké warming devices include automatic temperature control and automated switching of power to an 'on' or 'off' state in the presence or absence of a vessel on the burner. The Japanese patent, JP40903794, by Kibi uses an adjustable slider in combination with a bimetallic strip to control and detect the temperature of the bottom surface of the liquid containing vessel. The patent also describes a mechanism whereby the power is cut off once the liquid-containing vessel is removed. Japanese patent JP408024126A by Amano describes a Saké warmer and bottle assembly. The bottom section of the bottle is made from a metal having large thermal conductivity, such as aluminum or stainless steel. Direct heating of the bottle containing Saké is described.

The present invention introduces improvements to the devices as presented by the prior-art. In particular, in the case of the device described in patent JP408024126A, the response time of a thermal bimetallic switch used for interrupting power after removing a vessel from the burner will depend on ambient conditions and material and design properties of the switch. The present invention introduces a magnetic switch with relatively rapid response characteristics.

Furthermore, the JP408024126A patent uses a conduction path from the heat sensing element to cause the bimetallic strip to heat up and disengage the heating element. The thermal mass of said sensing element directly impacts the responsiveness of the system. The heat that is generated in the vessel will have to conduct through the sensing element to the bimetallic switch before the switch will mechanically shut off the heating element. Depending on the properties of the metal in the sensing element, it may take quite some time for the switch to activate. By the time the switch does activate, the temperature of the liquid in the vessel may be substantially warmer than desired. This phenomenon, called the thermal time constant, is defined as the time that it takes a system to respond to a measured value. The present invention takes the thermal measurement directly from the heater plate resulting in minimal delay from the time when the desired temperature of the plate is reached and when the heater is disengaged.

Patent JP408024126A by Amano describes an invention for improving the heating efficiency of a Saké warmer, wherein the heating assembly is in contact with approximately 30% of the Sake vessel on the bottom and sides. The heating assembly of the present invention contacts the bottom of the Sake vessel alone.

SUMMARY OF THE INVENTION

The present invention presents a warming tray apparatus upon which at least one vessel, preferably a tokkuri (a flask-shaped vessel) containing Saké is heated.

In one embodiment the apparatus for maintaining the internal temperature of the contents in a vessel, said vessel having a conducting plate with at least a portion in direct contact with the contents, comprising:
  (a) a tray with at least one electrical heating element permitting delivery of electrical energy between a power source and said heating element within said tray;
  (b) at least one temperature regulation circuit controlling electrical power delivery to said at least one electrical heating element;
  wherein said temperature regulation circuit in concert with said conducting plate monitors the temperature on the interior of the vessel and maintains the interior contents at a preset temperature.

In one embodiment the apparatus includes two separate thermostats that each provides specific criteria for cycling the on-off cycle of a heater element.

The apparatus includes at least one magnetically actuated switch operating in conjunction with at least one vessel mounted magnet used in combination for detecting the presence and absence of said vessel upon said tray. In a preferred embodiment, the conducting plate is magnetic and also functions as a magnetic actuator and a means for providing temperature information from the contents within the vessel to the thermostat.

There is also provided a spring activated actuator on the underside of the tray that interrupts said delivery of electrical energy to said heating element based on the placement of said tray of a flat surface.

The apparatus may be used to heat and maintain temperatures of liquids or semi solids. In a preferred embodiment, the apparatus is used to heat and maintain the temperature of Saké, tea, milk, sauces, or gravy.

In one embodiment, the vessel is a tokkuri with a ceramic upper section and a bottom section. The bottom section may be metallic, for example, stainless steel. The bottom section is attached by any appropriate means including screws or adhesive such that the bottom forms a liquid tight seal. In a preferred embodiment, the bottom section has at least sealing ring for forming a liquid tight seal. The bottom section comprises a plurality of component sections to facilitate tokkuri assembly and function.

One section of the vessel bottom includes a conducting plate and a conducting arm, wherein said arm is in contact with both the conducting plate and the interior contents of the vessel. The arm and plate act in concert with the temperature regulation circuit to maintain the interior contents at a preset temperature. The thermostat receives information via thermal conduction. The arm is in contact with the interior contents is heated to a temperature which heats the plate. The thermostat initiates the on-off heating cycle based on the temperature of the plate, the temperature of which is directly effected by the temperature of interior vessel contents.

Also contemplated is a method of warming a food product to a preset temperature using a temperature regulation circuit that regulates temperature based on the temperature of the vessel contents, in combination with at least one electrical heating element to apply heat selectively to the bottom of a vessel containing said food product.

At least one switch-activated electrical heating element resides within a thermally conductive tray. Said tray is designed to be precisely placed on a base housing so that electrical contacts positioned within said base align with electrical receptacles of individual heating elements within said tray, whereby electrical power is supplied from said base to said individual heating elements. Electrical power is supplied to said base through a power cord connected between said base and an external power source. Temperature regulation is performed by at least one thermostat.

The tray is may be removed from said base following heating of the Saké to the desired temperature, allowing convenient movement of the Tokkuri from the location of heating to the location of Saké consumption.

DETAILED DESCRIPTION OF THE EMBODIMENTS

Figure 1:
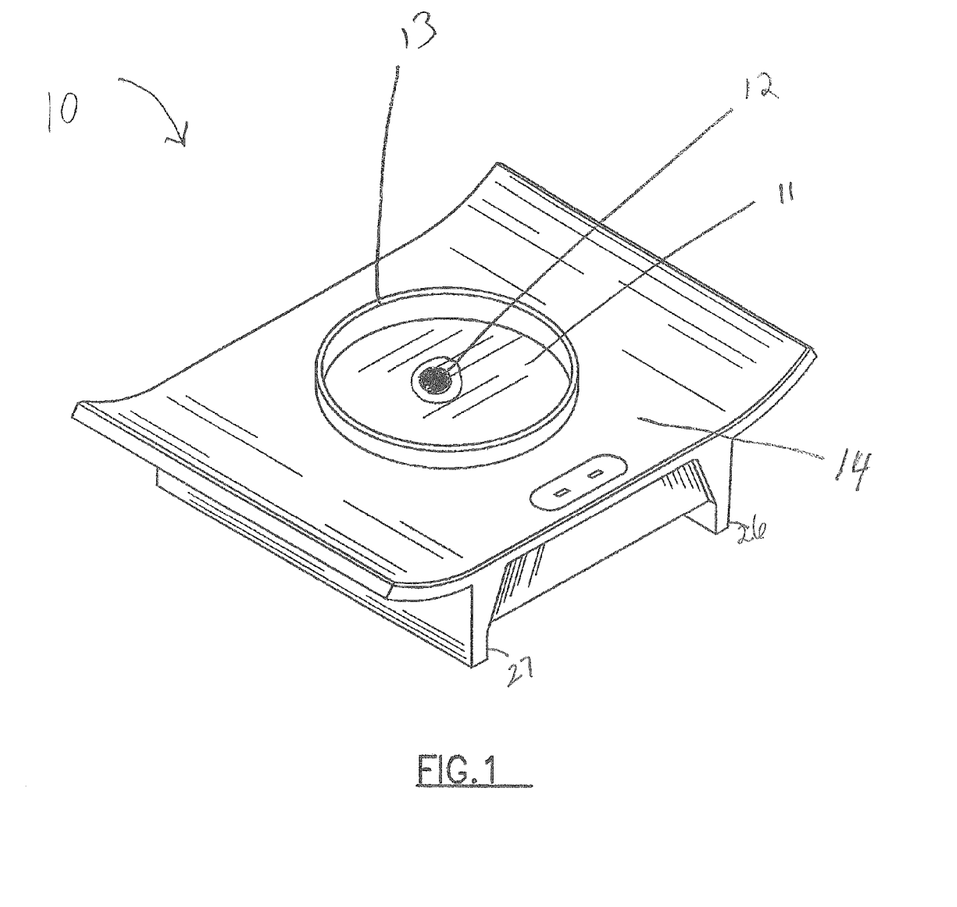
FIG. 1 a perspective view of the tray.
Figure 2:
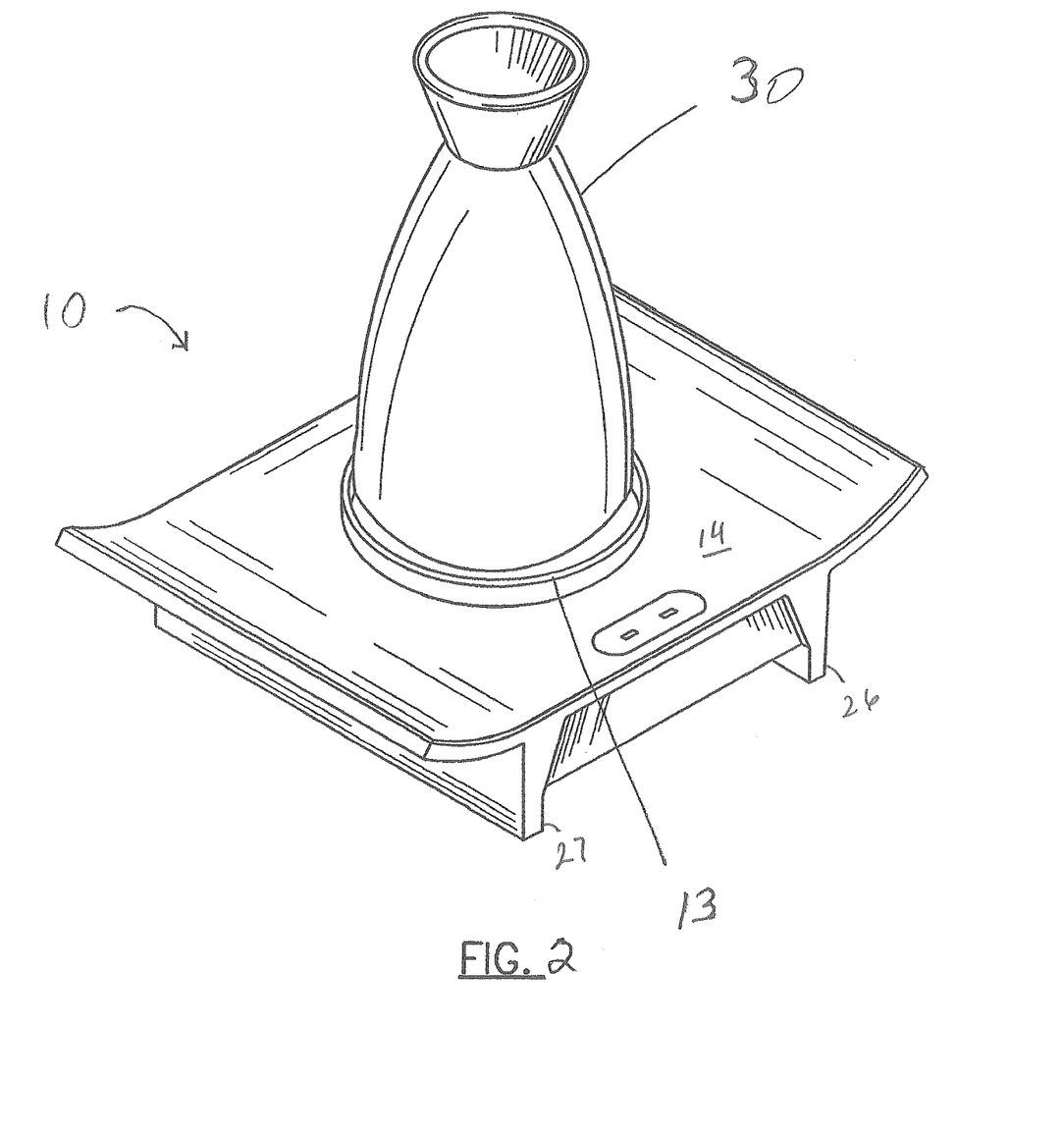
FIG. 2 is a perspective view of a vessel placed on the tray.
Figure 5:
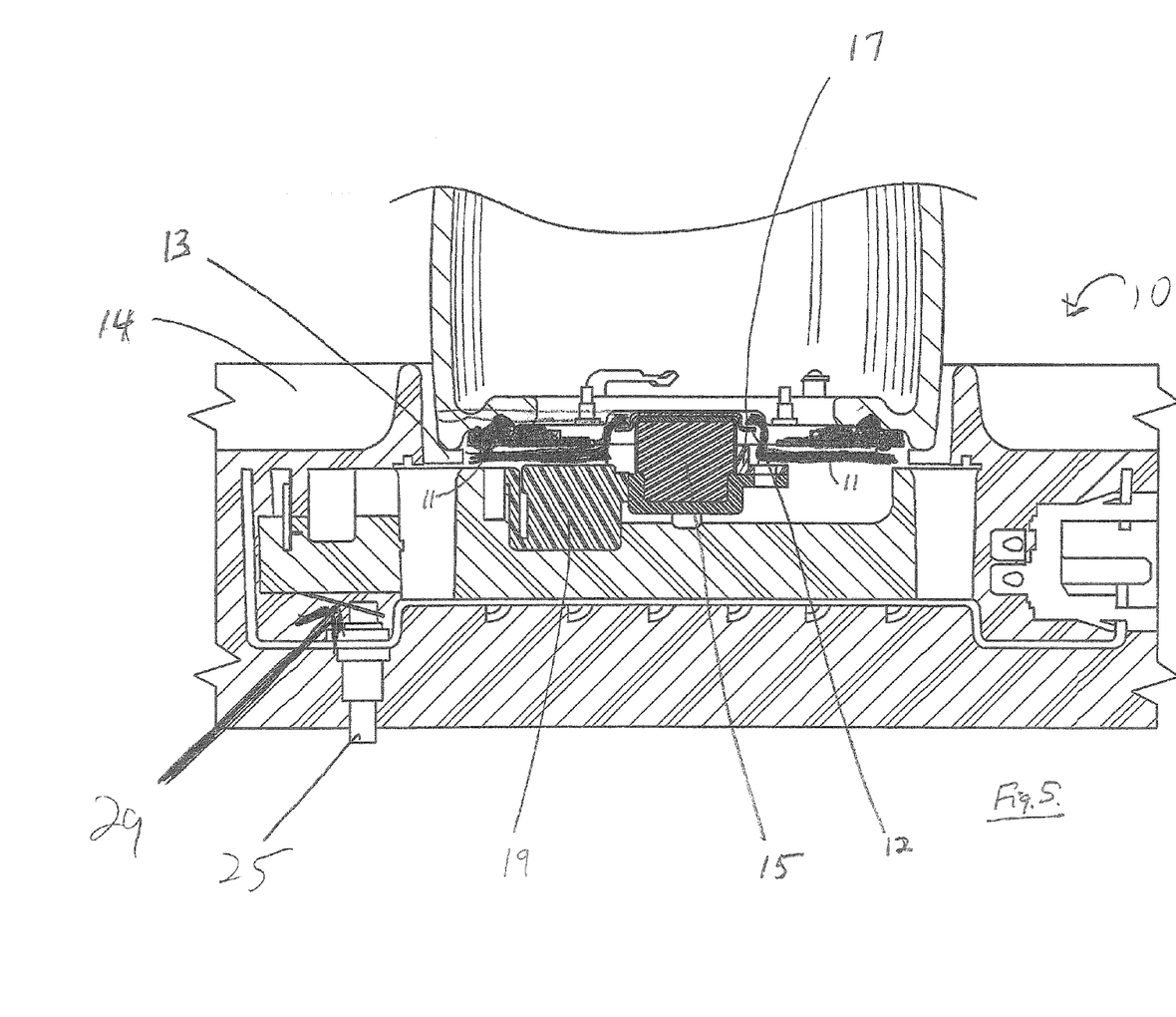
FIG. 5 is a side schematic diagrammatic in cross section view of the vessel and tray.

The present invention is a heating tray 10 that has a heating surface 11 within the inner boundary of vessel guide 13. Heating surface 11 is flat and round on its upper surface. Vessel guide 13 is a lip that is formed contiguous with tray surface 14 centrally located on the top of tray 10. In the center of heating surface 11 is a thermostat cap 12. Cap 12 protrudes through surface 11 and is integral with a first thermostat 15. Thermostat 15 is positioned on the underside of cap 12. The bottom of vessel 30 includes a conducting plate 34. Plate 34 contacts thermostat 15 when vessel 30 is placed on surface 11. Heating element 17 is connected to a source of electrical power and is in contact with heating surface 11 and acutated by thermostat 15.

Figure 4:
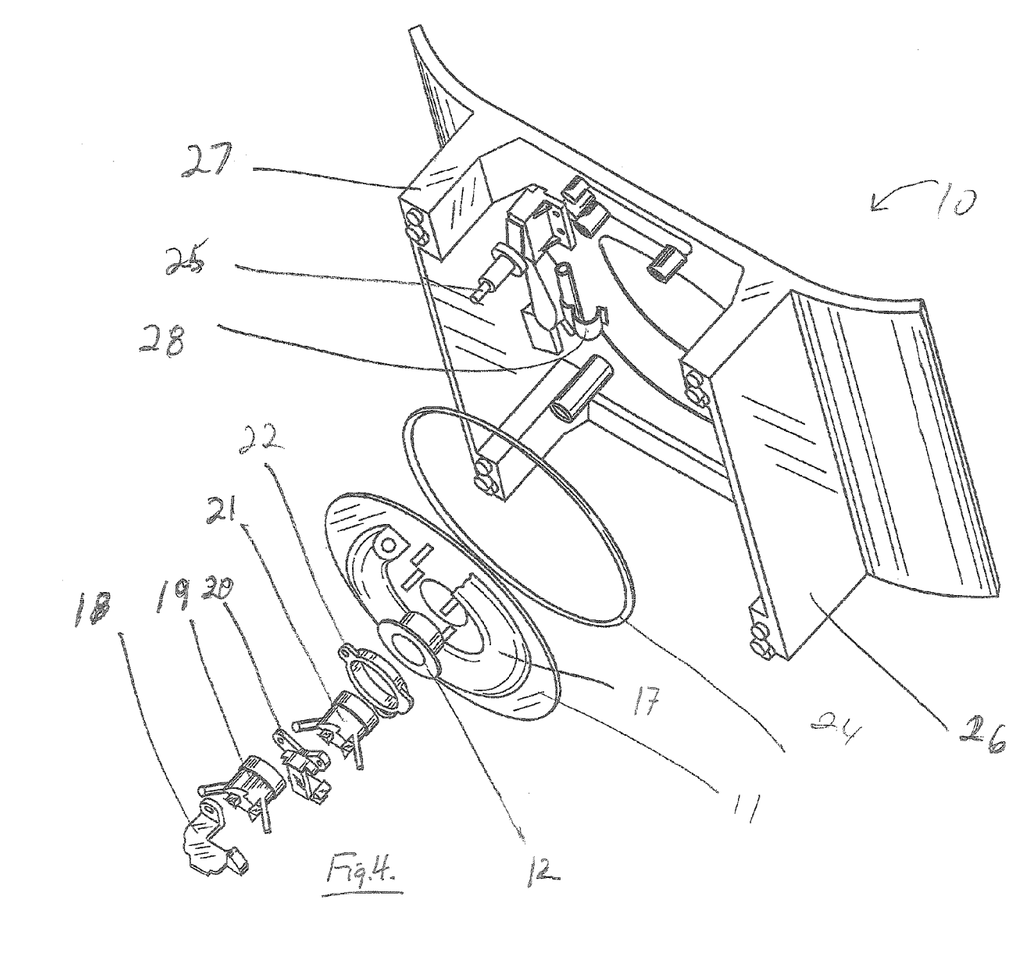
FIG. 4 is a side perspective view of the tray with disassembled component tray parts.

Tray 10 has an upper tray surface 14, a first support 26 and a second support 27 on the underside of tray 10. Tray 10 has a spring activated safety pin 25 that interrupts electrical power to heating element 17 when tray 10 is not placed with supports 26 and 27 contacting a surface or when tray 10 is lifted from a surface. Components of tray 10 include first thermostat 15 with a first thermostat support bracket 20, a second thermostat 19 with a second thermostat support bracket 18. Said first thermostat 15 is positioned under thermostat cap 12 such that cap 12 is in the center of heating surface 11. Heating surface 11 is adjacent to sealing ring 24 placed on the underside of tray surface 14. The tray components are secured upward from the disassembled configuration shown by any fastening means known in the art. The assembled tray components may be held in place by one or more mounting clips 28 on the underside of tray surface 14.

Figure 3:
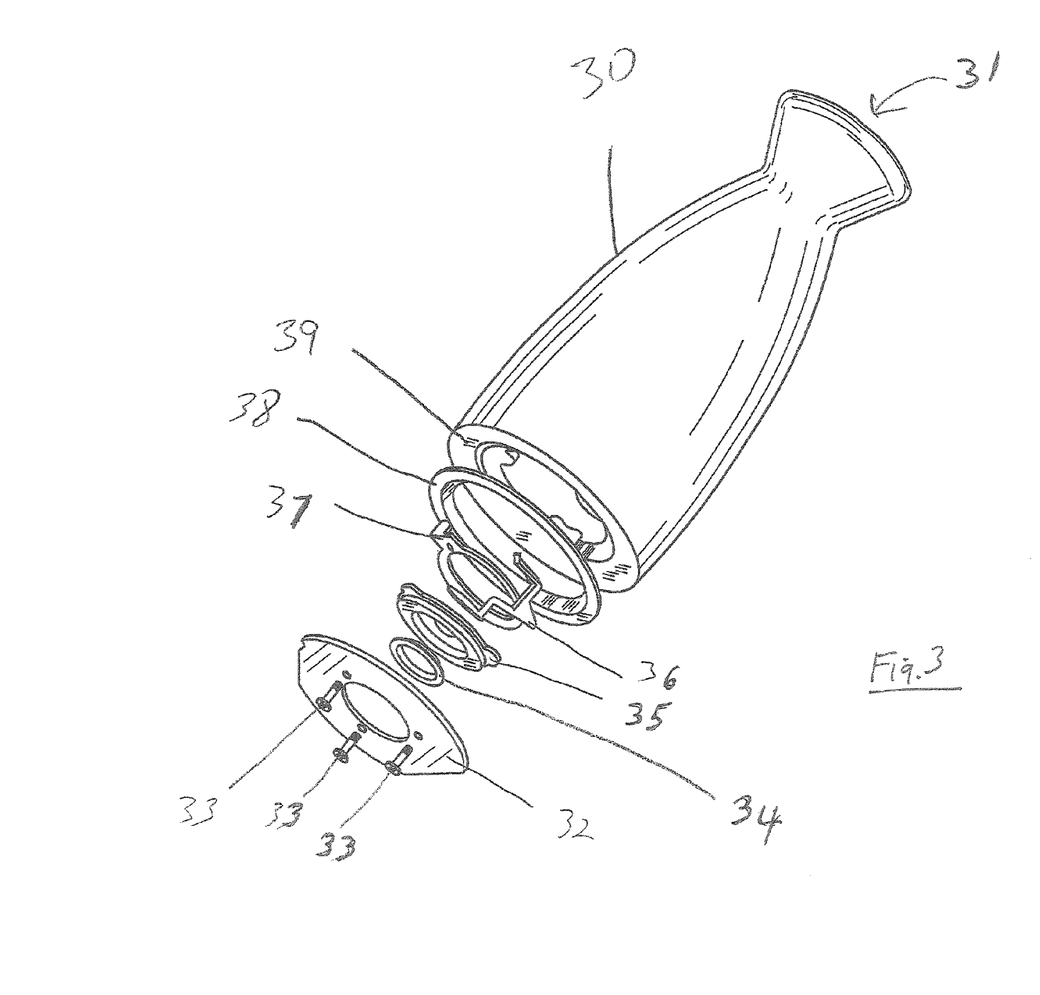
FIG. 3 is a side perspective view of the vessel with disassembled component base parts.

Tray 10 is used with a vessel 30 that is configured with components to interact with tray 10. Vessel 30 has a first open end 31 for adding and removing contents in the interior. The underside 39 of vessel 30 has a mounting plate 32 secured to underside 39 by mounting screws 33. Conducting plate 34 is centrally positioned on the interior underside of conducting plate sealing ring 35. Above ring 35 is a conducting arm 36 positioned by conducting arm support 37 such that arm 36 is in contact with plate 34. Vessel bottom seal ring 38 is positioned between plate 32 and underside 39.

Figure 6:
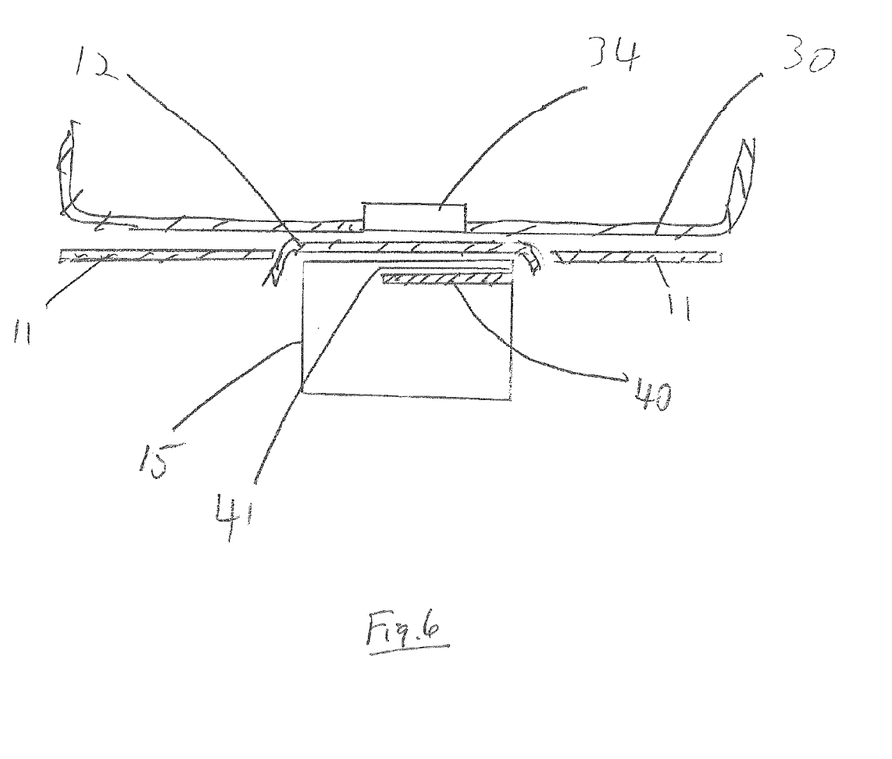
FIG. 6 is a side schematic diagrammatic in cross section view of the vessel and magnetically actuated switch.

A magnetically engaged actuator 40 is in the interior of thermostat 15 and placed below electrical contact 41.

Vessel 30 has conducting plate 34 that contacts and interacts in concert with conducting arm 36 on the interior of vessel 30. Arm 36 is made of any suitable thermally conductive material and exhibits thermal conductivity based on the temperature of the interior contents of vessel 30. The thermal conductivity propagates conductivity from arm 36 to plate 34. When vessel 30 is placed on heating surface 11 of tray 10, conducting plate 34 contacts cap 12 and allows thermostat 15 to receive a temperature reading from the contents inside vessel 30 by the aforementioned thermal conductivity. When the temperature of the interior contents is not in a preset range, the thermostat sends a signal and turns on or off heating element 17. When vessel 30 is positioned on surface 11, cap 12, continues the aforementioned thermal conductivity to thermostat 15. Thermostat 15 receives, by thermal conductivity, a temperature reading for the temperature of the internal contents of vessel 30. If the conducted temperature reading is below a pre set temperature, thermostat 15 signals tray 10 to turn on electrical power to element 17. If the conducted temperature reading is above a pre set temperature, thermostat 15 signals tray 10 to turn off electrical power to element 17. Thus, tray 10 provides an element 17 with on-off heat cycle parameters based on temperature of the internal contents of vessel 30.

Thermostat 16 monitors the temperature of heating surface 11 and further acts to send a signal to turn of heating element 17 when the temperature of heating surface 11 is above a pre set range. When tray 10 is lifted from a flat surface, spring 29 urges pin 25 downward and the electrical power to heater 17 is interrupted. Replacing tray 10 onto a flat surface engages pin 25 upward and activates electricity to heater 17 subject to thermostat 15 and placement of vessel on surface 11.

Vessel 30 has conducting plate 34 that additionally serves as a magnetic actuator. When vessel 30 is placed on heating surface 11, conducting plate 34 is above thermostat cap 12. Under cap 12 is magnetic actuator 40 that is urged upward toward contact 41 through magnetic attraction. When actuator 40 touches contact 41, an electrical circuit is completed and electricity is permitted to flow to heater 17. Removing vessel 30 subsequently disengages actuator 40 from contact 41 and electricity delivery to heater 17 is interrupted.

Thermostat 15 is a low temperature thermostat and is pre set to a range between about 40°-80° C. The range may be narrower if desired. Thermostat 15 turns on or off heating element 17 based on a reading of the a temperature measurement of the contents inside vessel 30. Vessel 30 includes a conducting plate 34 and a conducting arm 36, wherein said arm 36 is in contact with both plate 34 and the interior contents of vessel 30. Arm 36 and plate 34 act in concert with thermostat 15 to maintain the interior contents at a preset temperature. Thermostat 15 receives information via thermal conduction between arm 36 and the interior contents of vessel 30. Arm 36 is in contact with plate 34 and thermal conduction of temperature propagates to plate 34. Thermostat 15 initiates an on-off heating cycle based on the temperature of plate 34, the temperature of plate 34 is directly affected by the temperature of interior vessel contents.

Thermostat 19 is a high temperature thermostat and is pre set to a range between about 40°-90° C. The range may be narrower if desired. Thermostat 19 turns on or off heating element 17 based on a reading of the temperature of heating surface 11. Tray 10 has 2 thermostats that each establishes parameters for turning on element 17 and heating surface 11.

Tray 10 also has two separate safety mechanisms, for ensuring safe use of tray 10. When there is no vessel on the surface of tray 10, or when tray 10 is lifted from a resting surface, spring activated safety 25 interrupts electrical power to heater element 17. When vessel 30 is removed from heating surface 11, magnetic actuator 40 is disengaged and disrupts the electrical circuit and interrupts electrical power to heater element 17. When vessel 30 is returned to surface 11, the magnetic conducting plate 34 on the bottom of vessel 30 engages magnetic actuator 40 such that magnetic actuator 40 is urged upward and engages electrical contact 41 to complete an electrical circuit and power element 17.

Figure 7:
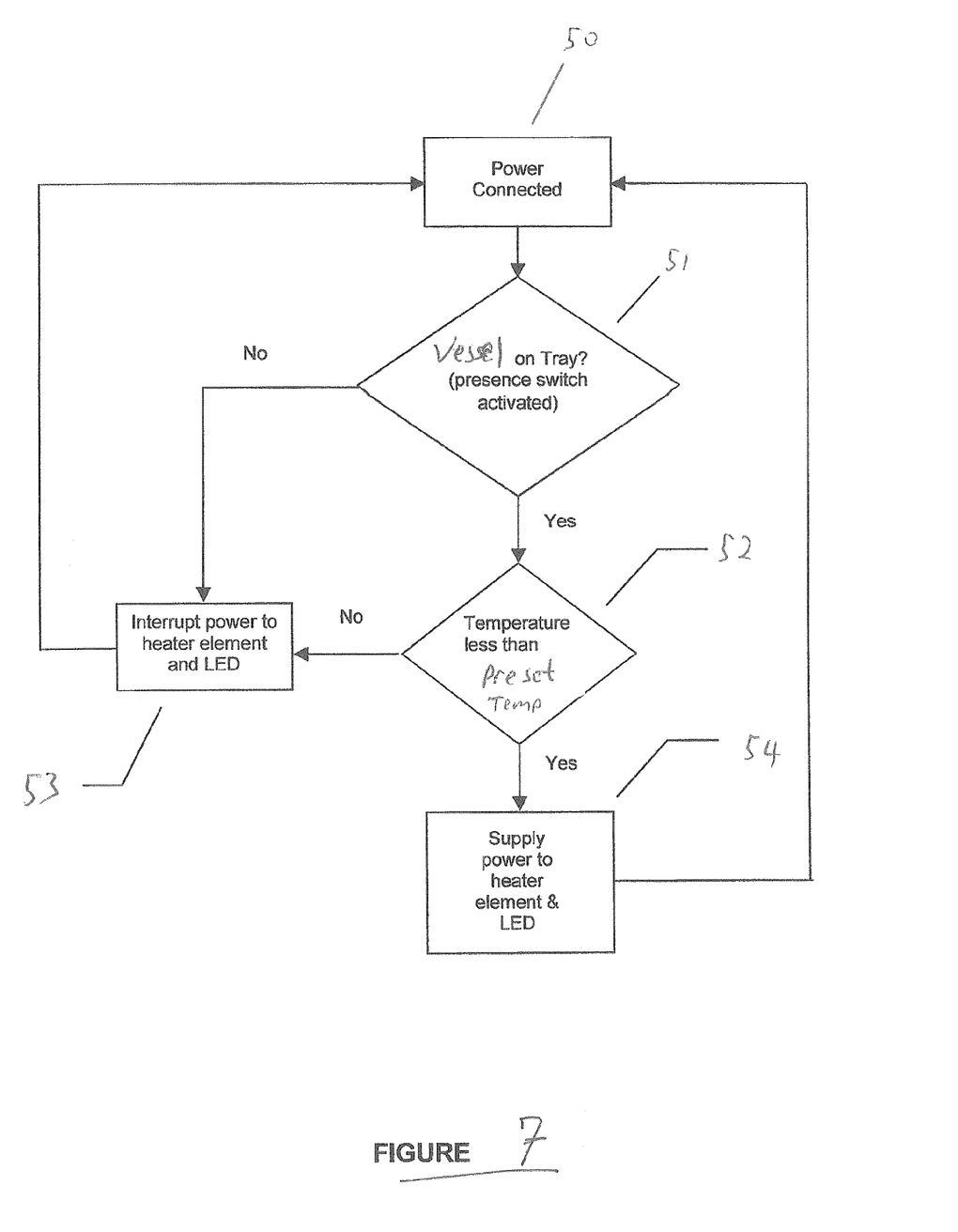
FIG. 7 is a flow chart of the mechanism of the actuation of the heater cycle.

FIG. 7 is a flow diagram outlining operation of one embodiment of the apparatus. When a power source is connected to tray 10, shown in box 50, the aforementioned magnetic actuator 40 detects the presence or absence of vessel 30, shown in box 51. If no vessel is detected, box 53 indicates power to heater element is interrupted and an appropriate indicator, such as LED and the like, may so indicate power interruption. If a vessel is detected, current is permitted to flow to heating element 17 and an appropriate power indicator, such as and LED and the like, may so indicate. If the vessel is removed from the tray, or the temperature monitored at the thermostat exceeds a pre set temperature, the power is interrupted to the heater element and an appropriate indicator, such as LED and the like, may so indicate power interruption. If the monitored temperature of the contents is below a pre set temperature, power is supplied to heater element 17, as indicated in box 54. As indicated, as long as power is available to the apparatus, these logic conditions form a continuous loop by circuitry within the apparatus.

While particular embodiments of the present invention have been shown and described, it will be obvious to those skilled in the art that changes and modification may be made without departing from this invention in its broader aspects and, therefore, the aim in the appended claims is to cover all such changes and modifications as fall within the true spirit and scope of this invention.

What is claimed is:

1. A heating apparatus comprising:
    a vessel for containing internal contents therein, said vessel having a conducting plate for contacting the internal contents;
    a tray having a heating surface for heating said vessel, a heating element disposed within said tray, and a temperature regulation circuit for controlling electrical energy delivery to said heating element from a power source;
    said temperature regulation circuit having a first thermostat configured for controlling the electrical energy delivered via said temperature regulation circuit based on an actual temperature of the internal contents determined by a temperature of said conducting plate; and
    said temperature regulation circuit having a second thermostat configured for controlling the electrical energy delivered via said temperature control circuit based on a temperature of said heating surface.

2. The apparatus of claim 1 wherein said tray comprises at least one magnetically actuated switch operating in conjunction with at least one vessel mounted magnet used in combination for detecting the presence and absence of said vessel upon said tray.

3. The apparatus of claim 1 wherein said temperature regulation circuit comprises a temperature detection device in contact with the vessel contents to regulate the on-off cycle of said heating element.

4. The apparatus of claim 1 comprising a spring activated actuator that interrupts said delivery of electrical energy to said heating element based on the placement of said tray of a flat surface.

5. The apparatus of claim 1 wherein said contents are a liquid or semi solid.

6. The apparatus of claim 1 wherein said contents are Sake, tea, milk, sauces, or gravy.

7. The apparatus of claim 1 wherein said vessel is a tokkuri with a ceramic upper section and a bottom section, said bottom section with said conducting plate and a conducting arm, wherein said conducting arm is in contact with both said conducting plate and interior contents of said vessel, said conducting arm and conducting plate are constructed and arranged to act in concert with one of said thermostats outside said vessel to maintain interior contents of said vessel at said preset temperature.

8. The tokkuri of claim 7 wherein said ceramic upper section is attached to said bottom section forms a liquid tight seal.

9. The tokkuri of claim 7 wherein said attachment of said upper section to said bottom section includes at least one sealing ring, forming a liquid tight seal.

10. The tokkuri of claim 7 wherein said bottom section comprises a plurality of components to facilitate tokkuri assembly.

11. The tokkuri of claim 7 wherein said bottom includes at least one magnetized portion for acting in concert with at least one magnetically actuated switch used in combination for detecting the presence and absence of said tokkuri upon said tray.

12. A method of warming a food product to a preset temperature using a temperature regulation circuit disposed within a heating tray, wherein said heating tray has a heating surface, said temperature regulation circuit regulates said temperature based on temperature regulation of said food product in a vessel, wherein said temperature regulation is by providing a vessel with a bottom section having a conducting plate and a conducting arm, wherein said conducting arm is in contact with both said conducting plate and said food product within said vessel, said conducting arm and conducting plate are constructed and arranged to act in concert with said temperature regulation circuit having a first thermostat outside said vessel to maintain interior contents of said vessel at a preset temperature, and a second thermostat based on a temperature of said heating surface in combination with at least one electrical heating element to apply heat selectively to the bottom of a vessel containing said food product.

13. The apparatus of claim 1 comprising each of:
a. one magnetically actuated switch operating in conjunction with at least one vessel mounted magnet used in combination for detecting the presence and absence of said vessel upon said tray; and
b. a spring activated actuator that interrupts said delivery of electrical energy to said heating element based on the placement of said tray on a flat surface.

\* \* \* \* \*